Sept. 1, 1964 J. LOISELEUR 3,147,133

METHOD FOR MANUFACTURING MIRRORS AND ARTICLE

Filed June 26, 1961

INVENTOR.
JEAN LOISELEUR
BY Bauer and Seymour
ATTORNEYS

United States Patent Office 3,147,133
Patented Sept. 1, 1964

3,147,133
METHOD FOR MANUFACTURING MIRRORS AND ARTICLE
Jean Loiseleur, Paris, France, assignor to Compagnie de Saint-Gobain, Neuilly-sur-Seine, France
Filed June 26, 1961, Ser. No. 119,502
Claims priority, application, France, July 5, 1960, 832,057
9 Claims. (Cl. 117—35)

This invention relates to the coating of surfaces which are inert to the ingredients of the coating baths and particularly to the preparation of mirrors in which the mirror surface is composed of silver-gilt or silver-rhodium. As the process has particular adaptation to the manufacture of mirrors, it will be described in that use.

There are numerous processes for gilding glass by putting the surface which is to be gilded in contact with the solution of a gold salt containing a reducing agent. These known processes produce on the glass the formation of a layer of pure gold which has the green color of gold by transmitted light. In such processes the surface of the glass undergoes a particular preparation which makes it capable of accepting a coat of gold molecules which are derived from a solution of a gold salt containing a reducing agent which makes the solution metastable and progressively liberates gold molecules.

For example, the particular preparation of the surface can be obtained either with colloidal gold or with a complex formed with two successive baths of metal hydrate, such as thin hydrate, followed by a noble metal such as silver nitrate. In all such cases the preliminary preparation of the surface is obtained by the formation of an elementary layer of the noble metal, a mono molecular layer which is invisible and does not, by itself, have reflective power; this preparatory layer does not possess metallic luster and has for its function only to accept the deposit of gold which is to be reduced thereon.

It is an object of this invention to prepare layers of silver-gilt or silver-rhodium and by an improved method producing a new and superior result.

In distinguishing from the known processes the process of the present invention is characterized by the success of two well defined steps:

(1) The surface of the glass or the synthetic plastic which is frequently used in place of glass is initially coated with a layer of silver of sufficient thickness to have reflective power, which requires the piling up of several hundreds of silver molecules. This initial thick silvering is obtained by the wet way by any means currently used by mirror makers.

Figure 2:
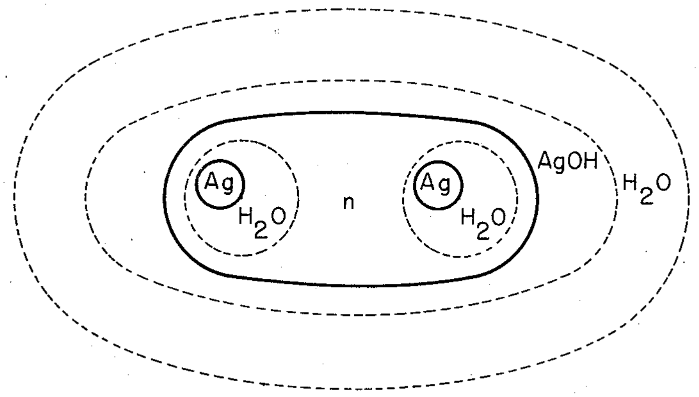

It will be helpful to recall the particular constitution of a silvering applied by the wet way. It is stated (Comptes Rendus de l'Academie des Sciences, 1939, t. 209, p. 993) that such silverings are constituted by the superposition of colloidal micells. In order to exemplify this, it may be imagined that a light silvering, still semi-transparent, corresponding to the deposit of 250 to 500 mg. of silver per square meter is constituted by piling up about 300 to 500 molecules of silver incorporated in the micells the nuclei of which are formed by the agglomeration of a plurality of silver microcrystals the stability of which is assured by a peripheral layer of silver hydrate. Furthermore, each micell and in the interior of each micell, each microcrystal of silver is surrounded by a body of attached water. This is represented by the diagrammatic showing of FIGURE 2 of the accompanying drawing.

(2) In a second step a gold salt or a rhodium salt is made to react on this thick silvered layer. A typical gilding solution contains .25 g. gold chloride, .50 g. potassium hydroxide and 25 to 40 mg. of sodium peroxide in enough distilled water to make 1,000 cc. The gold (or rhodium) displaces silver according to the reaction $$AuCl_3+3Ag\rightarrow\underline{Au}+3AgCl$$

This reaction results from the difference between electrolytic potentials of gold and silver, it being understood that the electrolytic potential of silver with respect to a hydrogen electrode is +0.771 volt and the potential of gold with respect to the same electrode is +1.079 volts. A similar difference between electrolytic potential exists between silver and rhodium and produces a like displacement of silver. The silver is progressively replaced by the gold and/or rhodium, forming alloys attached to the body on which the silver layer lies.

There is a substantial difference between the case of a plate of metallic silver which is immersed in a solution of a gold salt and the case of a layer of micells produced by the wet way immersed in the same solution of the gold salt and this difference will now be described.

Figure 1:
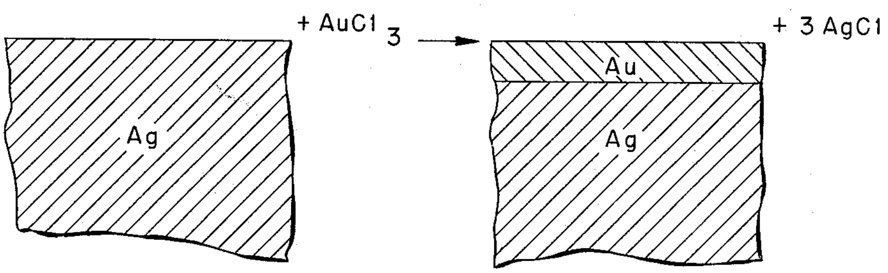

In the case of the plate of metallic silver the surface of the silver body covers itself with gold as schematically indicated in FIGURE 1 of the attached drawing. The reaction has for its effect to substitute a layer of gold for the exterior layer of silver, which stops the exchange reaction as soon as the gold layer is complete, while the silver chloride which has been formed during the reaction remains in solution because of its low concentration (solubility: 0.00064 in 100 millilit.). The layer of pure gold diffuses toward the interior of the silver plate, transforming the outer layer to an alloy of gold and silver (silver-gilt) in which the content of silver increases with time. For a certain value of this silver content the equilibrium between the silver present in the silver-gilt and the gold salt in solution breaks down permitting the repetition of the intial reaction, but with a much reduced speed corresponding to the coefficient of diffusion of metallic gold into metallic silver. In consequence, in the case of the metallic silver the transformation into silver-gilt by exchange reaction depends essentially from the speed of diffusion of the gold in silver, the concentration of the gold salt in the gilding solution having only a secondary importance. We have discovered that the phenomena are wholly different when they concern a silvering by the wet way, considered as it is withdrawn from the silvering bath.

In the case of a coating applied by the wet way and immersed in a gold salt, the diffusion of the gold salt through the layers of water attached to the micells is very rapid which permits the gold salt to act upon the totality of the silver molecules. This operation consequently depends essentially upon the concentrations of gold introduced into the gold salt solution, which permits the regulation at will of the composition of silver-gilt which is desired, attaining a result which is wholly different from that which occurs on the surface of a silver plate.

It is easy to control the formation of silver-gilt in operating, for example, on a silvered surface a substantial thickness, for instance 10 gms. per square meter. If this is plunged rapidly into a concentrated solution of gold salt and is withdrawn after several seconds, it has been established that the outer layer is constituted by gold which is substantially pure while the other face of the silvered layer still possesses the reflecting power of silver; by extending the duration of immersion in the bath beyond the several seconds referred to above this other face rapidly attains the appearance of silver-gilt. Inversely, in operating with a silvered layer of slight thickness the totality of the silvering is rapidly involved in the exchange reaction.

The water attached to the micells rapidly becomes saturated with silver chloride, which remains occluded in the gilded layer. This presence of silver chloride in the silver-gilt imparts to the metallic layer a blue color by transmitted light which is characteristic of silver sub-chloride and differs from the green referred to above. In the particular case where one has operated on a silvering of slight thickness the silver-gilt is constituted by a mixture of gold and silver-chloride.

The exchange reaction presumes the presence of metallic aggregates and not of oxides but the silvering by the wet way contains approximately 5% of silver oxide which leads one to introduce into the gold bath a trace of reducing agent in a very litle quantity corresponding to the amount of silver oxide which is to be reduced.

To reduce the concentration of silver chloride in the silver-gilt one may, in accordance with this invention, modify the composition of the gold salt bath by adding to it solvents for silver chloride such as sodium hyposulfite or ammonia. In general, the silver-gilt produced, even if it is very rich in gold, possesses the blue color by transmitted light which is characteristic of silver chloride.

The same process can be used to deposit on glass and synthetic plastics and on other mirror surfaces inert to the reagents alloys of silver and rhodium, of silver and gold, silver and rhodium, occluding silver chloride. The presence of occluded silver chloride is determinable upon inspection by transmitted light because of the bluish color imparted by silver sub-chloride.

The following examples describe the application of the invention to glass and to a synthetic plastic. The examples are illustrative and do not constitute a limitation on what is described and claimed generally elsewhere.

*Example 1*

In order to obtain a deposit of silver-rhodium on a transparent sheet of polymethyl methacrylate resin the sheet was first silvered in the wet way. The plastic was washed and cleansed of all impurities and dipped in an alcoholic bath containing 1 mg. of stannous chloride per liter of absolute alcohol. After several minutes the plastic was washed for 5 minutes in a stream of distilled water. It was then dipped into a silvering solution of ordinary formula, ammoniacal silver hydrate solution containing invert sugar, made by mixing .33 g. silver nitrate, .21 g. potassium hydroxide, .53 cc. of 22° Baumé ammonia, .37 g. of saccharose, .02 g. of tartaric acid and .56 cc. of absolute ethyl alcohol in enough distilled water to make 1,000 cc. In order to produce a semi-silvering of thin and regular distribution the semi-silvering was applied in three successive operations with silvering solutions of increasing concentration; for 30 seconds the solution was applied diluted to 1/50; thereafter it was rapidly removed and immersed for 30 seconds in the same solution diluted only to 1/10; it was then removed and quickly immersed in the same solution diluted to 1/4 for 40 to 60 seconds after which it was withdrawn and the plastic was covered with a brilliant and uniform silver coat. The weight of silver deposited was between 0.75 and 1 g. per square meter. The plastic was then washed and immediately immersed in a bath containing 4 mg. of the double chloride of rhodium and sodium, in 80 ml. of distilled water and 10 ml. of normal ammonia solution, the ammonia having the effect of assuring the solubilization of silver chloride as it was formed. This was heated to 50° C. and after 1 minute 2 mg. of sodium peroxide was added, which has the effect of assuring the transformation of the silver oxide in the silvering bath to metallic silver. It is thus a reducing agent. The heating was continued for 5 minutes and dried at 50° in an oven. The plastic was thus coated with a metal layer constituted by an alloy of silver-rhodium and a trace of silver chloride. This could be used as it was or could be further treated for the deposition of gold.

*Example 2*

To cover a glass surface with silver-gilt the glass is first silvered according to the standard usage of mirror makers in the wet way, either with a thick layer, as above explained, and which might correspond to a deposit of 2 g. of metal per square meter, or by the process which was described in Example 1. The process of Example 1 can be used very well for the production of a transparent semi-silvering. The glass, coated with this regular and brillant silvering is washed and plunged into a bath of the following composition, adapted to the coating of the surface of 80 $cm.^2$: 3.5+ mg. of gold, as chloride, are dissolved in 85 ml. of water and 20 mg. of caustic potash and 10 ml. of a normal ammonia solution are added, the ammonia assuring the solubilization of the silver chloride which forms in the silvering. After agitation there was added 1 mg. of sodium peroxide to transform any silver oxide to metallic silver and the whole was heated on a water bath to about 60° C. The silver-gilt appeared in the first few seconds. After 5 minutes the operation was ended and the sheet of glass was washed and dried.

If one operates with a semi-transparent silvering the luster of the silver-gilt is magnificient by reflection and blue by transmitted light, the blue tint being characteristic of the presence of a residue of silver sub-chloride occluded in the layer of silver-gilt.

The invention has been described with respect to the coating of transparent sheets, but is equally capable of coating non-transparent sheets and other minerals and inert plastic bodies such as mica, stone and various ethylenic polymers.

Among the substantial advantages of the present invention are that the manufacture of silver-gilt by this process is very economical. Furthermore, it is possible to regulate at will the gold and rhodium content of the silver layer by modifying the concentration of the gold salt in solution. An increase in the concentration of the gold salt results in increasing the gold content of the alloy. When one is applying thin layers which are transparent or translucent the deposit of metal is always very regular regardless of its thickness. It is especially to be noted that in conformity to the reaction $$AuCl_3+3Ag \rightarrow \underline{Au}+3AgCl$$

the thickness of the gold deposit is 1/3 of the thickness of the initial layer of silver. This regularity in thin deposits constitutes an advantage over the prior process of direct deposit or of reduction which presented irregularities and projections in deposits of equal thickness.

This process is extremely simple and very effective.

The invention includes the process and the new product. In the process the visible layer of silver having the reflective power of silver, which has been applied in the wet way, is reacted upon by the solution of a gold salt or a rhodium salt to initiate a displacement reaction between the silver initially deposited and the gold or rhodium in solution. The chlorides of gold or rhodium constitute satisfactory reactants. The glass or plastic is covered in an initial operation with a silvering of which the thickness is about 3 times the thickness of the deposit of silver-gilt which is to be produced. The bath in which the silver-gilt is produced receives a solubilizing agent designed to eliminate the silver chloride as it is formed, except for a trace which remains occluded in the minor layer. When the displacement reaction occurs on a silver surface constituted by metallic silver containing some silver oxide, there is added to the gold or rhodium salt solution enough reducing agent to assure the total reduction of the silver oxide.

As many apparently widely different embodiments of the present invention may be made without departing from the spirit and scope thereof, it is to be understood that the invention is not limited to the specific embodiments.

What is claimed is:

1. A method of applying a metal coat having a brilliant and bluish tone to an inert body which comprises applying to the body from a conventional silvering solution a layer of water-occluding silver micells of sufficient thickness to have visible reflective properties, covering the layer of micells with a solution of a salt of a metal capable of entering into a replacement reaction with silver, from the class consisting of gold and rhodium, until a substantial alloying of the metal with the silver layer has occurred by replacement reaction, removing the metallized body, cleansing it, and drying it.

2. The method of claim 1 in which the metallizing solution includes a reducing agent.

3. A mirror blank of brilliant bluish tone comprising a transparent body having an adherent layer composed in its essential ingredients of an alloy of silver and gold in which the silver in the silver gilt is of a thickness having visible reflective properties, said layer having a composition varying from front to back becoming pure gold at the back, and containing a minor but recognizable amount of silver chloride.

4. A mirror blank of brilliant bluish tone comprising a transparent body having an adherent layer composed in its essential ingredients of an alloy of silver and rhodium in which the silver in the silver rhodium is of a thickness having visible reflective properties, said layer having a composition varying from front to back becoming pure rhodium at the back, and containing a minor but recognizable amount of silver chloride.

5. A solid body having a thin layer adherent thereto composed in its essential ingredients of a brilliant bluish alloy of silver having a thickness exhibiting visible reflective properties with at least one of a group of alloying metals consisting of gold and rhodium, said layer varying in composition from the back to the front, at least the intermediate thickness being a replacement alloy of silver with alloying metal, said alloy containing occluded silver chloride.

6. A method of making a reflective coat on a body which comprises silvering the surface of the body by a conventional silvering solution to a thickness having visible reflective properties, applying to the freshly silvered surface a solution of a gold chloride, thereby displacing silver with gold, and producing a surface having a brilliant and bluish tone.

7. A method of making a mirror which comprises silvering the surface of a transparent glass object to a thickness having visible reflective properties, washing the object and immersing the freshly silvered object in an aqueous ammoniacal bath containing about 3.5 mg. of gold as chloride and 20 mg. of caustic potash, agitating, and adding sodium peroxide, heating the bath at about 60° C., and removing, washing and drying the object.

8. A method of making a mirror which comprises cleansing the surface of a transparent, synthetic plastic object, immersing the object in an alcoholic bath containing about 1 mg. of stannous chloride per liter of absolute alcohol, removing the object and washing it in running, distilled water, immersing the freshly silvered object in a series of aqueous, ammoniacal solutions of silver hydrate of increasing concentration, containing invert sugar, until a coating having visible reflective properties is formed, immersing the object in an aqueous ammoniacal solution of the double chloride of rhodium and sodium at a temperature of 50° C., adding a reducing agent to the bath, and drying the object at about 50° C.

9. A method of coating the surface of an object inert to the reagents used in the coating operation which comprises silvering the surface which is to be coated to a thickness having visible reflective properties, with a conventional silvering solution, displacing part of the silver from the micells of the coat by applying to the freshly deposited silver a solution of a salt of one of the class of metals consisting of gold and rhodium which is capable of a replacement reaction with silver, displacing more silver from the coat by applying to the coat a solution of a salt of the other metal of said group which is capable of entering into a replacement reaction with silver, and cleansing and drying the object.

References Cited in the file of this patent

FOREIGN PATENTS

| | | |
|---|---|---|
| 147,562 | Germany | Dec. 14, 1903 |
| 178,523 | Germany | Nov. 24, 1906 |
| 635,101 | Great Britain | Apr. 5, 1950 |